US007015803B2

(12) United States Patent
Yamagiwa et al.

(10) Patent No.: US 7,015,803 B2
(45) Date of Patent: Mar. 21, 2006

(54) TIRE AIR PRESSURE DETECTING DEVICE

(75) Inventors: Toshio Yamagiwa, Saitama (JP);
Tomoyuki Harada, Saitama (JP);
Hiroyuki Kawasaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 457 days.

(21) Appl. No.: 10/058,278

(22) Filed: Jan. 30, 2002

(65) Prior Publication Data

US 2002/0101341 A1 Aug. 1, 2002

(30) Foreign Application Priority Data

Jan. 30, 2001 (JP) ......................... 2001-022332

(51) Int. Cl.
*B60C 23/00* (2006.01)

(52) U.S. Cl. .................. 340/447; 73/146.5; 340/444
(58) Field of Classification Search ......... 340/442–448; 73/146.5
See application file for complete search history.

(56) References Cited

U.S. PATENT DOCUMENTS

| 3,840,850 | A | * | 10/1974 | Whiteing et al. ........... 340/448 |
| 5,285,189 | A | * | 2/1994 | Nowicki et al. ............ 340/447 |
| 5,517,853 | A | | 5/1996 | Chamussy |
| 5,963,128 | A | * | 10/1999 | McClelland ................ 340/447 |
| 6,300,867 | B1 | * | 10/2001 | Rea et al. .................. 340/442 |
| 6,469,989 | B1 | * | 10/2002 | Ernst ......................... 370/311 |
| 6,535,116 | B1 | * | 3/2003 | Zhou ......................... 340/447 |
| 6,580,364 | B1 | * | 6/2003 | Munch et al. .............. 340/447 |
| 6,609,419 | B1 | * | 8/2003 | Bankart et al. ............ 73/146.5 |

FOREIGN PATENT DOCUMENTS

| EP | 0 739 761 A1 | 10/1996 |
| JP | 9-240446 | 9/1997 |
| WO | WO 96/06747 A2 | 3/1996 |

* cited by examiner

*Primary Examiner*—Brent A. Swarthout
(74) *Attorney, Agent, or Firm*—Birch Stewart Kolasch & Birch, LLP

(57) ABSTRACT

A tire air pressure detecting device has a tire air pressure detecting device on a wheel. A main transmitting device is provided at the wheel for transmitting an air pressure signal SP to a vehicle body. A main receiving device is provided at the vehicle body for receiving the air pressure signal SP. A main switch turn-on detecting device is provided on the vehicle body for detecting the turn-on of a main switch. A second control device is provided on the vehicle body for receiving the air pressure signal SP and a main switch ON signal Son. An auxiliary transmitting device on the vehicle body transmits a transmission instruction signal SR to the wheel when the second control means receives the main switch ON signal Son. An auxiliary receiving device on the wheel receives the transmission instruction signal SR. A first control device is provided for reading a new air pressure signal SP. When the main switch is turned on, the state of the tire air pressure can immediately be recognized. The main transmitting means is not required to transmit the air pressure signal at all times or increase the frequency with which to transmit the air pressure signal. Thus, the consumption of the battery at the wheel can be reduced.

11 Claims, 8 Drawing Sheets

TIRE AIR PRESSURE DETECTING DEVICE

CROSS-REFERENCE TO RELATED APPLICATIONS

The present application claims priority under 35 USC 119 to Japanese Patent Application No. 2001-022332 filed on Jan. 30, 2001 the entire contents thereof is hereby incorporated by reference.

BACKGROUND OF THE INVENTION

1. Field of the Invention

The present invention relates to a tire air pressure detecting device for monitoring whether a tire air pressure is lowered when a main switch is turned on after a motor vehicle has stopped with the main switch being turned off, and reducing the consumption of a battery on transmission side.

2. Description of Background Art

One tire air pressure detecting device for detecting the air pressure of a tire and dealing with a situation where the air pressure of the tire suffers an abnormal condition is known, for example, from Japanese patent laid-open No. Hei 9-240446 entitled "Brake Control Device."

As shown in FIG. 4 of the above publication, the disclosed tire air pressure detecting device has a left front wheel air pressure sensor 14 (the reference numerals are from the description of the publication) and a right front wheel air pressure sensor 15 for directly measuring the air pressures of tires. A receiver (no reference numeral) is provided for receiving signals representing the air pressures which are transmitted from the left and right front wheel air pressure sensors 14, 15. A controller 30 receives the signals representing the air pressures from the receiver. A warning unit 8 is provided for issuing a warning based on a signal from the controller 30 if the air pressures of the tires become lower than a predetermined value.

With the arrangement disclosed in the above publication, while the motor vehicle is stopping with a main switch being turned off, since the receiver and the controller 30 on the vehicle body are not energized, the receiver is unable to receive signals of tire air pressure when the air pressures of the tires drop while the motor vehicle is stopped.

When the main switch is then turned on and the receiver and the controller 30 are operated, unless latest air pressure signals are transmitted from the left and right front wheel air pressure sensors 14, 15 until the motor vehicle starts to move after the main switch is turned on, the warning unit 8 is not activated and the driver is unable to know the tire air pressure drop when the motor vehicle starts to move.

One solution would be to construct the left and right front wheel air pressure sensors 14, 15 to transmit signals at all times. However, since the left and right front wheel air pressure sensors 14, 15 and a transmitter associated therewith would be required to be energized at all times, the consumption of the battery which energizes the left and right front wheel air pressure sensors 14, 15 and the transmitter would be accelerated.

SUMMARY AND OBJECTS OF THE INVENTION

It is an object of the present invention to provide a tire air pressure detecting device which is capable of detecting a latest tire air pressure at the time a main switch is turned on after a motor vehicle has stopped with the main switch being turned off, and of reducing the consumption of a battery on a transmission side.

To achieve the above object, there is provided a tire air pressure detecting device for monitoring a tire air pressure by transmitting a signal representing the tire air pressure detected at a wheel to a vehicle body and receiving the signal representing the tire air pressure at the vehicle body. A tire air pressure detecting means is provided on the wheel for detecting the tire air pressure. Main transmitting means are provided on the wheel for transmitting an air pressure signal representing the tire air pressure detected by the tire air pressure detecting means to the vehicle body. Main receiving means are provided on the vehicle body for receiving the air pressure signal transmitted from the main transmitting means. A main switch turn-on detecting means is provided on the vehicle body for generating a main switch ON signal when the turn-on of a main switch is detected. Vehicle body side control means are provided on the vehicle body for receiving the air pressure signal received by the main receiving means and the main switch ON signal generated by the main switch turn-on detecting means. Auxiliary transmitting means are provided on the vehicle body for transmitting a transmission instruction signal to the wheel to transmit a new air pressure signal from the main transmitting means to the main receiving means based on a vehicle body side control signal from the vehicle body side control means when the vehicle body side control means receives the main switch ON signal. Auxiliary receiving means are provided on the wheel for receiving the transmission instruction signal transmitted from the auxiliary transmitting means. Wheel side control means are provided on the wheel for generating a wheel side control signal to read a new air pressure signal from the tire air pressure detecting means and transmit the air pressure signal to the main transmitting means based on the transmission instruction signal received by the auxiliary receiving means.

According to the present invention, when the main switch is turned on, a transmission instruction signal is sent from the auxiliary transmitting means to the auxiliary receiving means to enable the vehicle body side control means to read a new air pressure signal. Therefore, the state of the tire air pressure can be recognized immediately when the main switch is turned on.

The main transmitting means is not required to transmit the air pressure signal at all times or increase the frequency with which to transmit the air pressure signal, and the consumption of the battery at the wheel can be reduced.

According to the present invention, there is provided a tire air pressure detecting device for monitoring a tire air pressure by transmitting a signal representing the tire air pressure detected at a wheel to a vehicle body and receiving the signal representing the tire air pressure at the vehicle body. Tire air pressure detecting means are provided on the wheel for detecting the tire air pressure. Transmitting means are provided on the wheel for transmitting an air pressure signal representing the tire air pressure detected by the tire air pressure detecting means to the vehicle body. Receiving means on the vehicle body receives the air pressure signal transmitted from the transmitting means. A main switch turn-off detecting means is provided on the vehicle body for generating a main switch OFF signal when the turn-off of a main switch is. Vehicle body side control means are provided on the vehicle body for receiving the main switch OFF signal generated by the main switch turn-off detecting means and the air pressure signal received by the receiving means and storing the air pressure signal. A vehicle body side timer on the vehicle body is provided for operating the receiving means for a constant period of time at each of predetermined time intervals when the vehicle body side control means receives the main switch OFF signal.

With the present invention, when the main switch is turned off, the receiving means is operated for a constant period of time at each of predetermined time intervals to enable the vehicle side control means to receive and store the air pressure signal until the main switch is turned on. When the main switch is turned on, the latest tire air pressure before the motor vehicle starts to move can be recognized from the stored air pressure signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
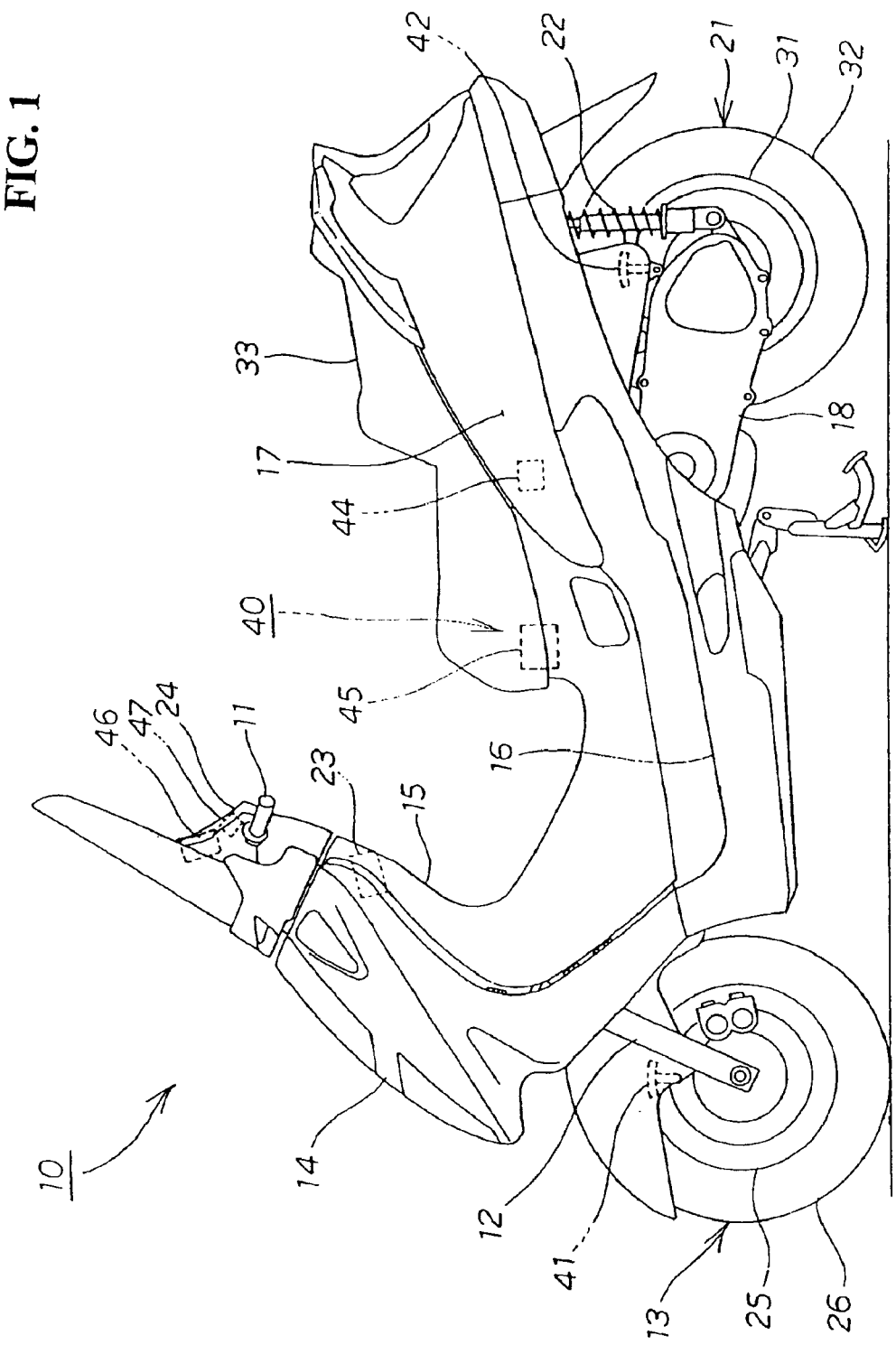
FIG. 1 is a side elevational view of a motorcycle which incorporates a tire air pressure detecting device according to the present invention.

An embodiment of the present invention will be described below with reference to the accompanying drawings. FIG. 1 is a side elevational view of a motorcycle which incorporates a tire air pressure detecting device according to the present invention. The motorcycle 10 includes a handle 11, a front fork 12 and a front wheel 13 as a wheel which is steerably mounted on a lower portion of the handle 11. A front cover 14 and a front inner cover 15 are provided for covering the lower portion of the handle 11 and an upper portion of the front fork 12. A floor step 16 is disposed behind the lower portion of the front cover 14. A body cover 17 extends upwardly and rearwardly from the floor step 16. A power unit 18 extends rearwardly from within the body cover 17. A rear wheel 21 is mounted on a rear portion of the power unit 18. An air suspension device 22 extends between a rear end portion of the power unit 18 and a vehicle frame, not shown, in the body cover 17.

A main switch 23 is disposed in an upper portion of the front inner cover 15 for energizing and de-energizing an electric system when the main switch 23 is turned on and off with a key inserted therein. An instrument panel 24 is mounted on the handle 11. The front wheel 13 has a wheel 25 and a tire 26, and the rear wheel 21 has a wheel 31 and a tire 32. A rider's seat 33 is mounted on the body cover 17.

The tire air pressure detecting device, denoted by 40, has a front wheel air pressure detector 41 mounted on the wheel 25 of the front wheel 13 for detecting the air pressure and temperature of the tire 26 and transmitting the detected data to a vehicle body side controller, described later on. A rear wheel air pressure detector 42 is mounted on the wheel 31 of the rear wheel 21 for detecting the air pressure and temperature of the tire 32 and transmitting the detected data to the vehicle body side controller. An engine output changer 44 is provided for changing the output of the engine. A controller 45 is provided for receiving detected signals from the air pressure detectors 41, 42, operating a warning unit, described later on, and controlling the engine output changer 44. A display unit 46 responsive to signals from the controller 45 is provided for displaying the air pressure of the tire 26 of the front wheel 13, the temperature of the tire 26 of the front wheel 13, the air pressure of the tire 32 of the rear wheel 21 and the temperature of the tire 32 of the rear wheel 21. A warning unit 47 is provided for issuing a warning when each of the air pressures and temperatures of the tires 26, 32 becomes abnormal.

The controller 45 is disposed beneath the rider's seat 33, for example, and the display unit 46 and the warning unit 47 are disposed on or around the instrument panel 24, for example.

Figure 2:
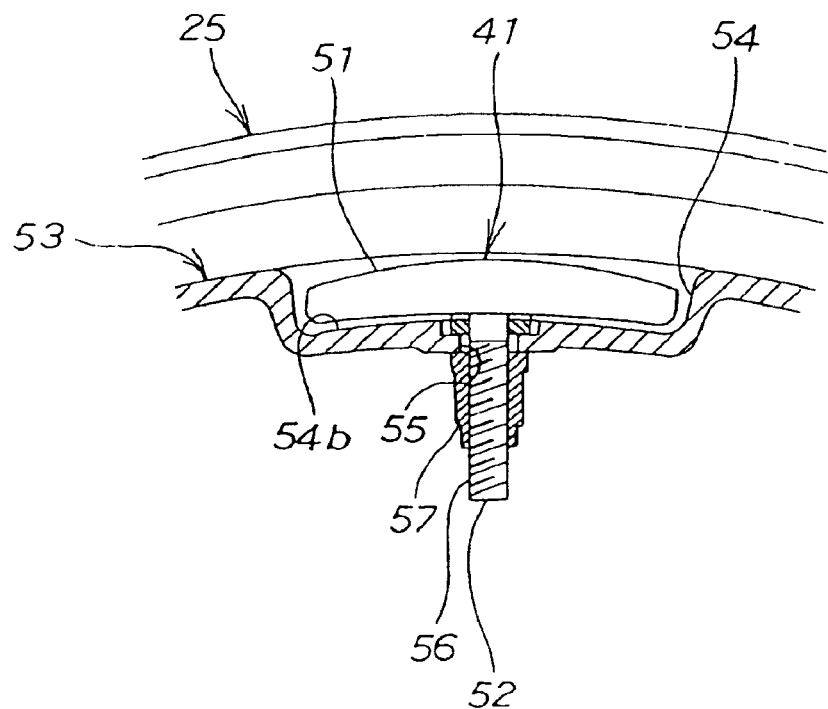
FIG. 2 is a first cross-sectional view showing the manner in which the air pressure detector of the tire air pressure detecting device according to the present invention is installed.

FIG. 2 is a first cross-sectional view showing the manner in which the air pressure detector of the tire air pressure detecting device according to the present invention is installed. The air pressure detector 41 for the front wheel will be described below. The air pressure detector 42 for the rear wheel is identical in structure to the air pressure detector 41 for the front wheel, and will not be described below with reference to FIG. 2 and subsequent figures.

The air pressure detector 41 includes a detector body 51 and a tire valve 52 mounted on the detector body 51. The tire valve 52 is opened only when air is supplied into the tire 26 (see FIG. 1) and is closed to prevent the air supplied into the tire 26 from flowing out. The detector body 51 is disposed in a recess 54 defined in the bottom of a rim 53, and the tire valve 52 is inserted in a valve insertion hole 55 defined in the bottom of the rim 53. A nut 57 is threaded over an externally threaded surface 56 of the tire valve 52, thus attaching the air pressure detector 41 to the wheel 25.

Figure 3:
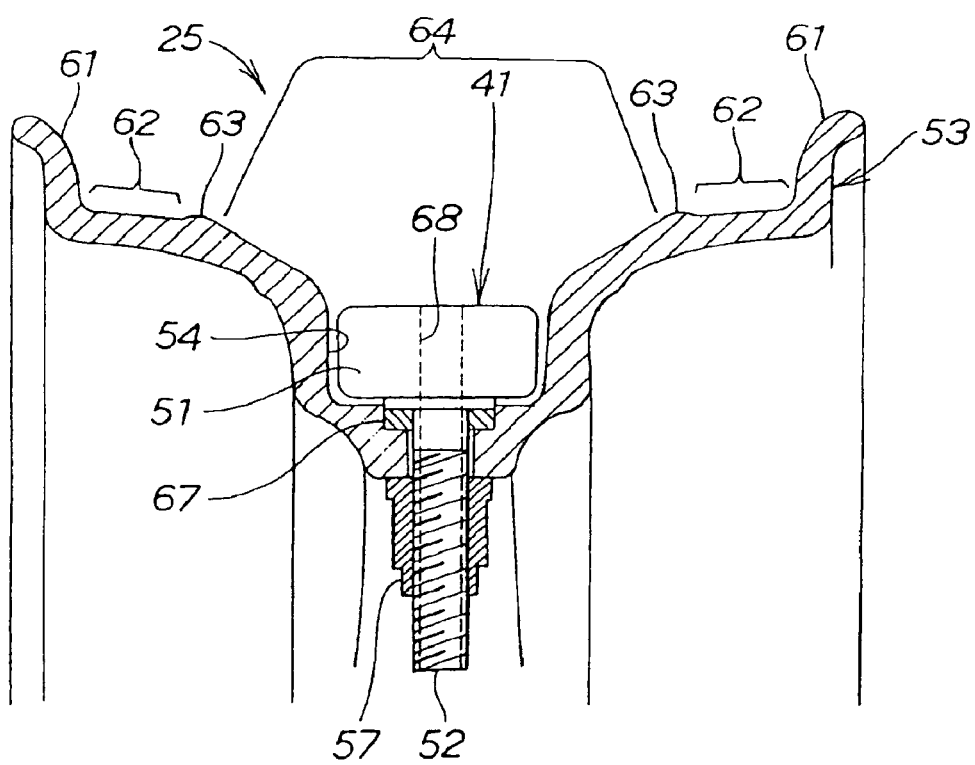
FIG. 3 is a second cross-sectional view showing the manner in which the air pressure detector of the tire air pressure detecting device according to the present invention is installed.

FIG. 3 is a second cross-sectional view showing the manner in which the air pressure detector of the tire air pressure detecting device according to the present invention is installed.

The wheel 25 includes a pair of flanges 61, a pair of bead seats 62 disposed inwardly of the flanges 61, a pair of humps 63 raised inwardly of the bead seats 62, a rim drop 64 disposed as a recess between the humps 63, and the recess 54 disposed in the rim drop 64.

The bead seats 62 serve to hold the beads of the tire 26 (see FIG. 1). The humps 63 include annular ridges for preventing the tire 26 from being dislodged from the bead seats 62 of the wheel 25. The rim drop 64 is deeply recessed to allow the tire 26 to be installed and removed with ease.

A seal member 67 serves to prevent the air from leaking out of the air chamber in the tire 26. A communication hole 68 (closed by a valve body, not shown) is defined in the tire valve 52 to provide communication between the interior and exterior of the tire 26.

Figure 4:
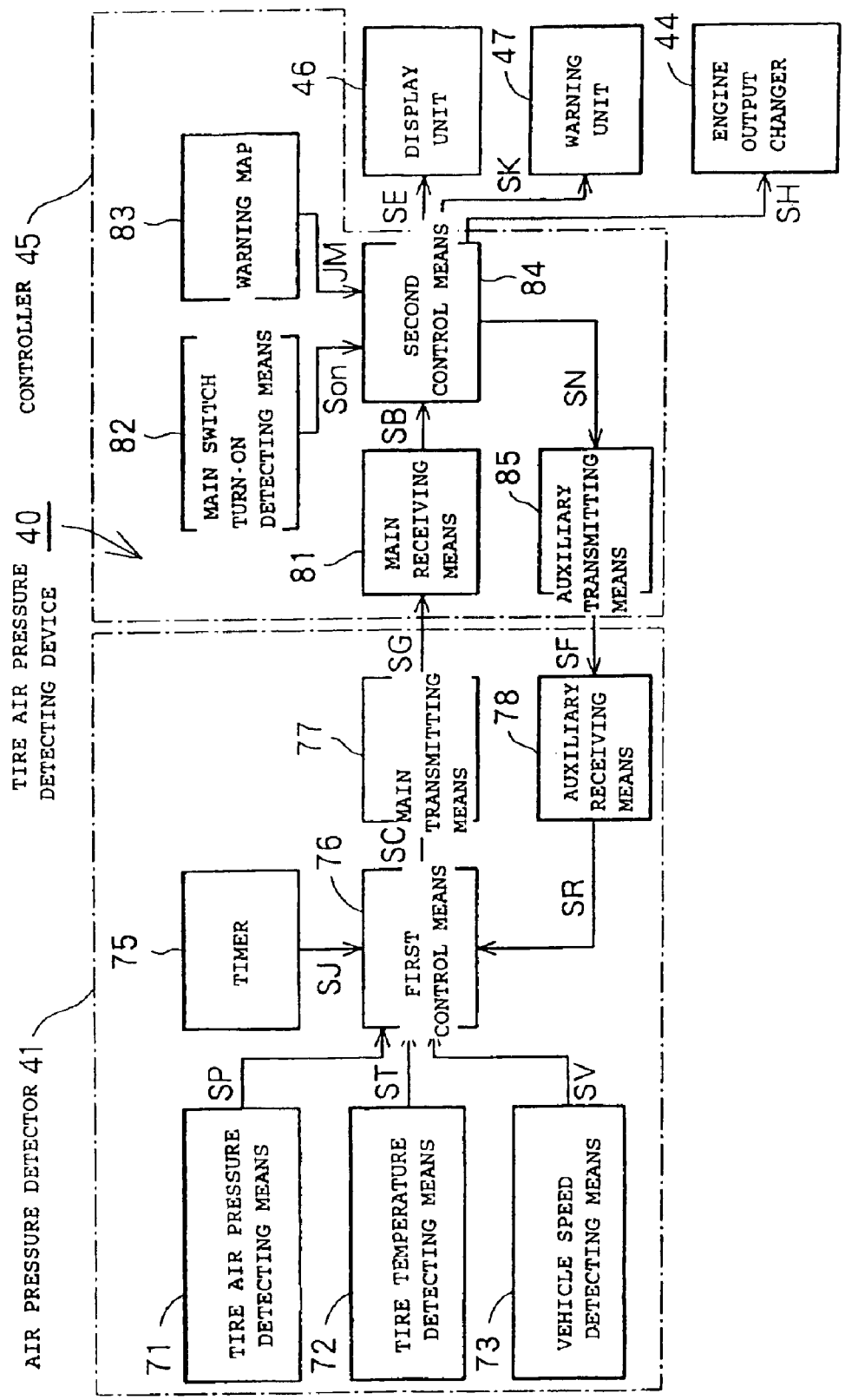
FIG. 4 is a block diagram of the tire air pressure detecting device according to the present invention.

FIG. 4 is a block diagram of the tire air pressure detecting device according to the present invention. As described above, the tire air pressure detecting device 40 includes the air pressure detector 41, the controller 45, the display unit 46, the warning unit 47, and the engine output changer 44.

The air pressure detector 41 includes a tire air pressure detecting means 71 for detecting the tire air pressure of the front wheel 13 (see FIG. 1, which is equal to the rear wheel 21 for the air pressure detector 42 (see FIG. 1)). A tire temperature detecting means 72 is provided for detecting the tire temperature of the front wheel 13. A vehicle speed detecting means 73 is provided for detecting the vehicle speed of the motorcycle (see FIG. 1). A timer 75 for generates a time signal SJ. A first control means 76 as a wheel side control means is provided for reading at given time intervals, i.e., at a given frequency, an air pressure signal SP from the tire air pressure detecting means 71, a temperature signal ST from the tire temperature detecting means 72, and a vehicle speed signal SV from the vehicle speed detecting means 73, based on the time signal SJ from the timer 75. A main transmitting means 77 is provided for receiving a wheel side control signal SC including the air pressure signal SP and the temperature signal ST read by the first control means 76 and transmitting a main transmission signal SG at a given frequency to the controller 45. An auxiliary receiving means 78 is provided (to be described in detail later on) for receiving a signal SR from the controller 45, and a battery, not shown.

The tire air pressure detecting means 71 includes a pressure sensor, for example, and the tire temperature detecting means 72 includes a temperature sensor such as a thermocouple or the like, for example.

The first control means 76 reads the air pressure signal SP and the temperature signal ST at a lower frequency (once in every 15 seconds, for example) when the vehicle speed V is lower, and reads the air pressure SP and the temperature signal ST at a higher frequency (once in every 0.5 second, for example) when the vehicle speed V is higher.

The vehicle speed and the reading frequency may be related to each other linearly, i.e., proportionally, or may be related to each other such that the reading frequency increases quadratically depending on the vehicle speed or may be related to each other such that the reading frequency varies stepwise when the vehicle speed exceeds a certain vehicle speed (e.g., 80 km/h).

Since the first control means 76 reduces the reading frequency as the vehicle speed V is lower, the consumption of the battery for the air pressure detector 41 (see FIG. 1) is reduced, allowing the air pressure detector 41 to be used for an increased period of time.

When the vehicle speed is high, reduction of the tire air pressure can be detected at an early stage by increasing the reading frequency. Therefore, it becomes possible to issue a warning immediately and to control the output of the engine.

The controller 45 includes a main receiving means 81 for receiving the main transmission signal SG transmitted from the main transmitting means 77. A main switch turn-on detecting means 82 for generates a main switch ON signal Son when the turn-on of the main switch is detected. A warning map 83 stores in a ROM a range of tire air pressures and a range of vehicle speeds for issuing a warning and controlling the engine output when the tire air pressures of the front wheel 13 and the rear wheel 21 are lowered. A second control means 84 is provided as a vehicle body side control means for reading a reception output signal SB from the main receiving means 81 and generating a display signal SE, and generating a warning signal SK and an engine control signal SH based on the reception output signal SB, the main switch ON signal Son, and map information JM, and an auxiliary transmitting means 85 responsive to a vehicle body side control signal SN from the second control means 84 for transmitting a signal (transmission instruction signal SR) to instruct the first control means 76 to newly read the air pressure signal SP and the temperature signal ST and transmit the air pressure signal SP and the temperature signal ST from the main transmitting means 77 to the main receiving means 81, as an auxiliary transmission signal SF to the auxiliary receiving means 78.

The engine output changer 44 is a device for changing the engine output in response to the engine control signal SH from the second control means 84, and may be an actuator which includes a motor and a solenoid using a negative pressure and an oil pressure of the engine and is mounted on the throttle shaft of the engine, so as to serve as a device for operating the throttle shaft, an ignition device operable under ignition control, a device for cutting off the supply of fuel, a device for changing the resistance of an AC generator, or the like.

The display unit 46 serves to display the tire air pressure (actual air pressure) and the tire temperature in response to the display signal SE from the second control means 84.

The warning unit 47 serves to issue a warning in response to the warning signal SK from the second control means 84, and may be mounted in the helmet worn by the driver.

The main switch turn-on detecting means 82 includes, for example, a switch integrally combined with the main switch 23 (see FIG. 1), and generates a main switch ON signal when the main switch 23 is turned on.

Figure 5:
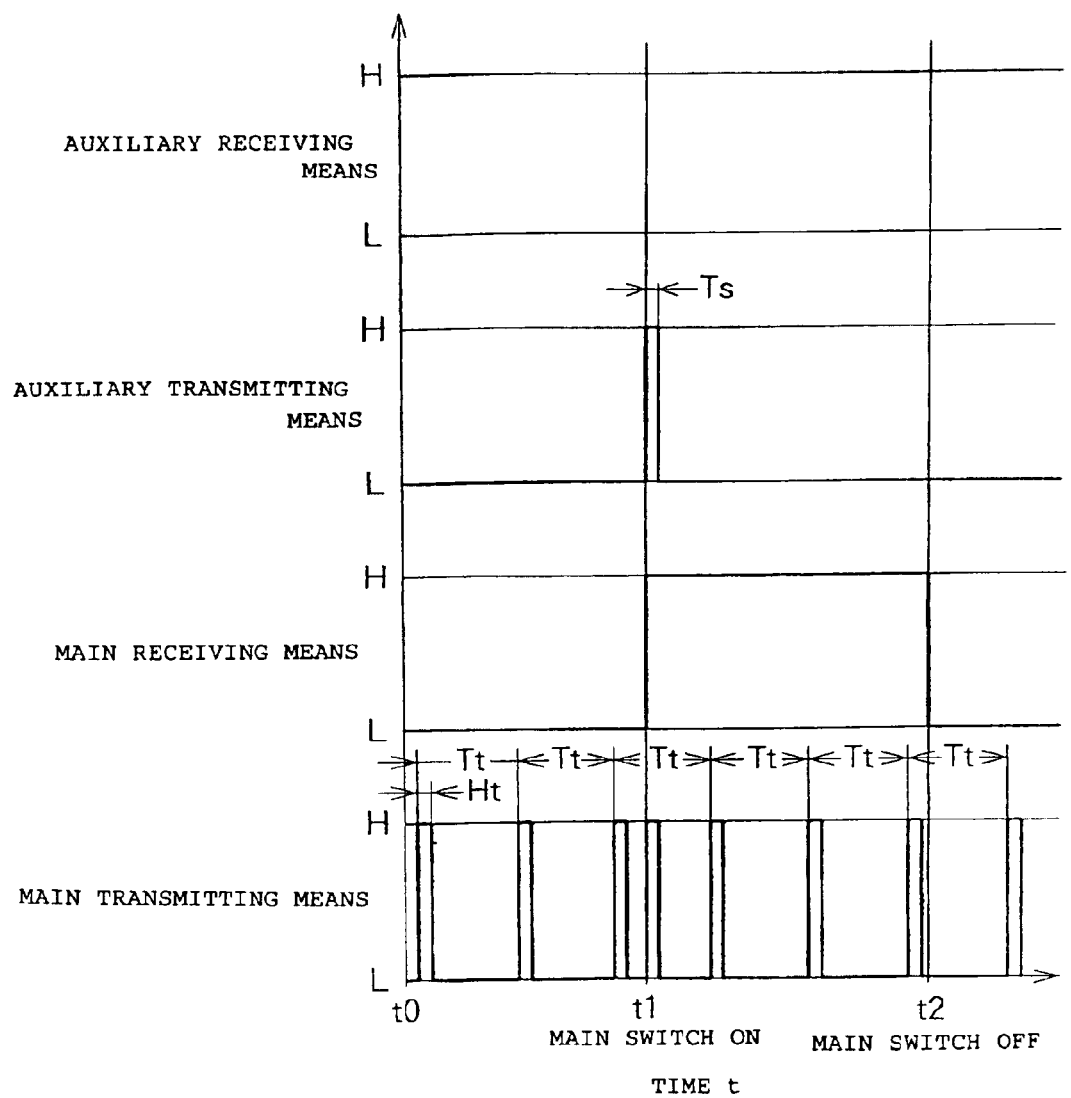
FIG. 5 is a graph illustrative of operation of the tire air pressure detecting device according to the present invention.

Operation of the tire air pressure detecting device 40 described above will be described below. FIG. 5 is a graph illustrative of operation of the tire air pressure detecting device according to the present invention, that illustrates the operation of the main transmitting means 77, the main receiving means 81, the auxiliary transmitting means 85, and the auxiliary receiving means 78 described with reference to FIG. 4. The vertical axis of the graph represents the operating states of the main transmitting means 77, the main receiving means 81, the auxiliary transmitting means 85, and the auxiliary receiving means 78 as an H level (when these means operate) and an L level (when these means do not operate), and the horizontal axis of the graph represents time t.

When the time t is t0 (zero), the main transmitting means has already transmitted the air pressure signal and the temperature signal at a given frequency to the main receiving means with the battery of the air pressure detector at the wheel. Operating time intervals of the main transmitting means, i.e., transmitting time intervals, are referred to as "Tt", and the operating times of the main transmitting means, i.e., the transmitting times at the transmitting time intervals Tt, are referred to as "Ht".

At this time (t=t0), the main receiving means and the auxiliary transmitting means are not operating, and the auxiliary receiving means is operated at all times with the battery at the wheel to wait for transmissions from the auxiliary transmitting means.

If the main switch is turned on (ON) when the time t becomes t1, the auxiliary transmitting means operates for a given time Ts, and transmits the auxiliary transmission signal SF to the auxiliary receiving means within the time Ts.

As a result, the auxiliary receiving means receives the auxiliary transmission signal from the auxiliary transmitting means.

Figure 6:
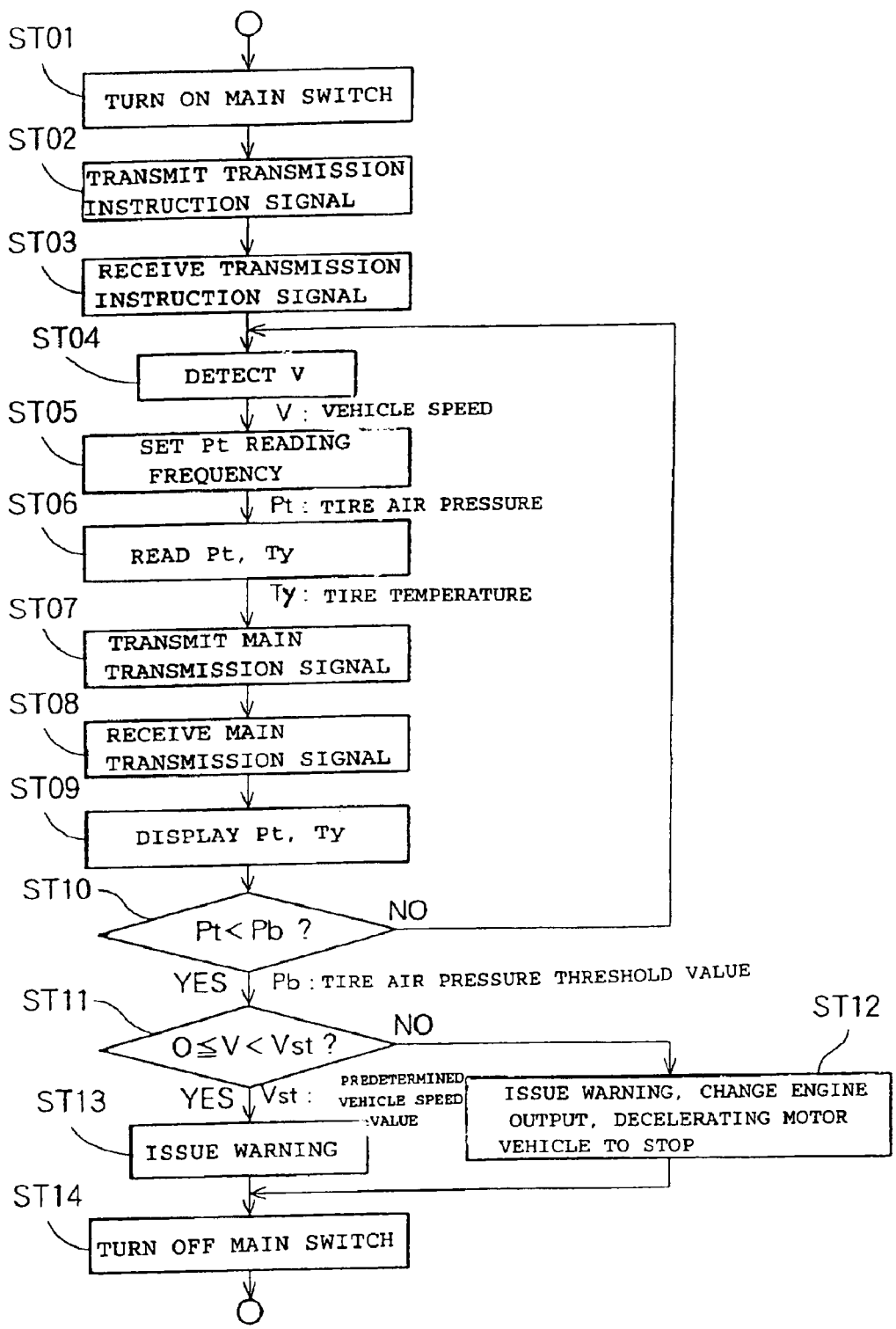
FIG. 6 is a flowchart illustrative of operation of the tire air pressure detecting device according to the present invention.

FIG. 6 is a flowchart illustrative of operation of the tire air pressure detecting device according to the present invention. In FIG. 6, Stxx represents a step number (FIGS. 1 and 4 should be referred to for the reference numerals).

ST01 . . . The main switch 23 is turned on.

ST02 . . . The second control means 84 is operated to instruct the auxiliary transmitting means 85 to transmit the transmission instruction signal SR as the auxiliary transmission signal SF to the auxiliary receiving means 78 to transmit a new tire air pressure Pt and a new tire temperature Ty from the wheel.

ST03 . . . The first control means 76 receives the transmission instruction signal SR received by the auxiliary receiving means 78.

ST04 . . . The vehicle speed detecting means 73 detects a vehicle speed V.

ST05 . . . Based on the vehicle speed V, the first control means 76 sets a frequency at which to read the tire air pressure Pt.

ST06 . . . The first control means 76 reads the tire pressure Pt and the tire temperature Ty.

ST07 . . . The first control means 76 sends the wheel side control signal SC to the main transmitting means 77, and the main transmitting means 77 transmits the main transmission signal SG.

ST08 . . . The main transmission signal SG is received by the main receiving means 81.

ST09 . . . The tire pressure Pt and the tire temperature Ty are displayed.

ST10 . . . The second control means 84 determines whether the tire pressure Pt obtained from the wheel side control signal SC received by the main receiving means 81 becomes lower than a tire air pressure threshold value Pb or not, i.e., whether Pt<Pb or not.

If not Pt<Pb (NO), then control returns to ST04.

If Pt<Pb (YES), then control goes to ST11.

ST11 . . . It is determined whether the vehicle speed V is equal to or higher than 0 (zero) and less than a predetermined vehicle speed value Vst ($0 \leq V < Vst$) or not, i.e., whether or not the motor vehicle is stopping or nearly stopping.

If not $0 \leq V < Vst$ (NO), i.e., if the vehicle is running, then control goes to ST12.

If $0 \leq V < Vst$ (YES), i.e., if the motor vehicle is stopping or nearly stopping, then control goes to ST13.

ST12 . . . The warning means 47 issues a warning, and the engine output changer 44 changes the engine output, decelerating the motor vehicle to stop.

ST13 . . . The warning means 47 issues a warning.

ST14 . . . The main switch 23 is turned off.

As described above with reference to FIGS. 1 and 4, the present invention resides in the tire air pressure detecting device 40 for monitoring a tire air pressure Pt by transmitting a signal representing the tire air pressure Pt detected at a wheel to a vehicle body and receiving the signal representing the tire air pressure Pt at the vehicle body, characterized by including the tire air pressure detecting means 71 on the wheel for detecting the tire air pressure Pt of the tires 26, 32, and the main transmitting means 77 on the wheel for transmitting an air pressure signal SP representing the tire air pressure Pt detected by the tire air pressure detecting means 71 to the vehicle body. The main receiving means 81 on the vehicle body receives the air pressure signal SP transmitted from the main transmitting means 77, the main switch turn-on detecting means 82 on the vehicle body for generating a main switch ON signal Son when the turn-on of the main switch 23 is detected, the second control means 84 on the vehicle body for receiving the air pressure signal SP received by the main receiving means 81 and the main switch ON signal Son generated by the main switch turn-on detecting means 82, and the auxiliary transmitting means 85 on the vehicle body for transmitting a transmission instruction signal SR as an auxiliary transmission signal SF to the wheel to transmit a new air pressure signal SP from the main transmitting means 77 to the main receiving means 81 based on a vehicle body side control signal SN from the second control means 84 when the second control means 84 receives the main switch ON signal Son. The auxiliary receiving means 78 on the wheel receives the transmission instruction signal SR transmitted from the auxiliary transmitting means 78. The first control means 76 on the wheel generates a wheel side control signal SC to read a new air pressure signal SP from the tire air pressure detecting means 71 and for transmitting the air pressure signal SP to the main transmitting means 77 based on the transmission instruction signal SR received by the auxiliary receiving means 78.

When the main switch 23 is turned on, the auxiliary transmitting means 85 sends the transmission instruction signal SR to the auxiliary receiving means 78, thus enabling the second control means 84 to read the new air pressure signal SP. Therefore, the state of the tire air pressure can be recognized immediately when the main switch is turned on. The driver is thus capable of knowing a reduction in the air pressure in the tire before the motor vehicle runs.

The main transmitting means 77 is not required to transmit the air pressure signal SP at all times or to increase the frequency with which to transmit the air pressure signal SP, so that the consumption of the battery at the wheel can be reduced.

Figure 7:
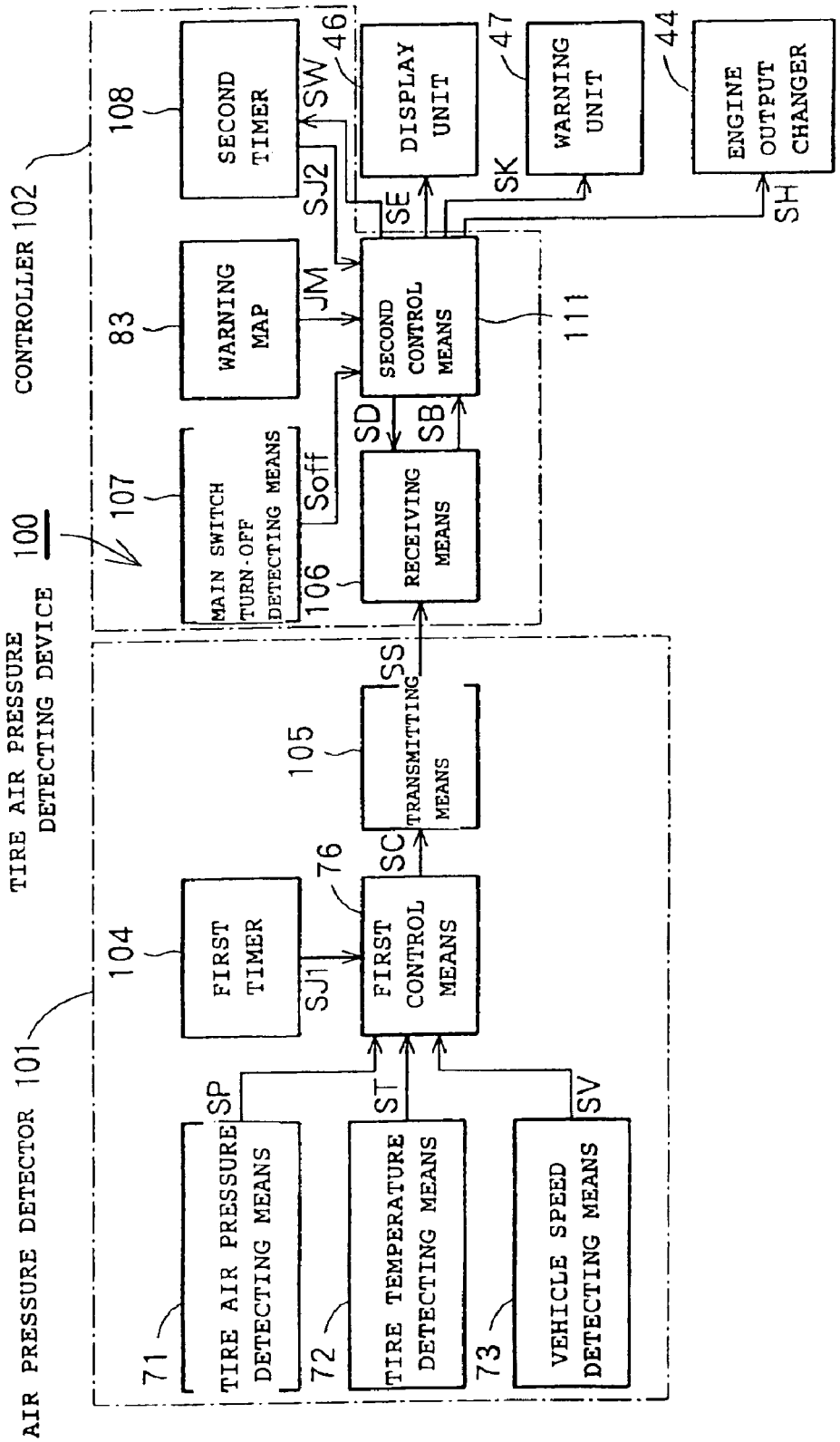
FIG. 7 is a block diagram of a tire air pressure detecting device according to another embodiment of the present invention.

FIG. 7 is a block diagram of a tire air pressure detecting device according to a second embodiment of the present invention. Those parts of the tire air pressure detecting device according to the other embodiment which are identical to those of the embodiment shown in FIGS. 1 through 6 are denoted by identical reference characters, and will not be described in detail below.

The tire air pressure detecting device 100 has an air pressure detector 101 associated with each of the front wheel 13 (see FIG. 1) and the rear wheel 21 (see FIG. 1), and a controller 102 mounted on the vehicle body.

The air pressure detector 101 includes a tire air pressure detecting means 71, a tire temperature detecting means 72, a vehicle speed detecting means 73, a first timer 104 for generating a first time signal SJ1, a first control means 76, a transmitting means 105 for receiving a read signal SC (an air pressure signal SP and a temperature signal ST) read by the first control means 76 and transmitting the read signal SC at a given frequency as a transmission signal SS to the controller 102, and a battery, not shown. The controller 102 includes a receiving means 106 for receiving the transmission signal SS transmitted from the transmitting means 105, a main switch turn-off detecting means 107 for generating a main switch OFF signal Soff when the turn-off of the main switch 23 (see FIG. 1) is detected, a warning map 83, a second timer 108 as a vehicle body side timer for generating a second time signal SJ2, and a second control means 111 as a vehicle body side control means for reading a reception output signal SB from the receiving means 106, generating a display signal SE, and generating a warning signal SK and an engine control signal SH based on the reception output signal SB, the main switch OFF signal Soff, map information JM, and the second time signal SJ2.

When the second control means 111 receives the main switch OFF signal Soff which is generated by the main switch turn-off detecting means 107 when it detects the turn-off of the main switch, the second control means 111 sends an operating signal SW to the second timer 103 to activate the second timer 108 and sends a drive signal SD to the receiving means 106 based on the main switch OFF signal Soff, and operates the receiving means 106 for a certain period of time at given time intervals to read a new reception output signal SB based on the second time signal SJ2 from the second timer 108, and stores a tire air pressure Pt and a tire temperature Ty obtained from the read reception output signal SB.

Figure 8:
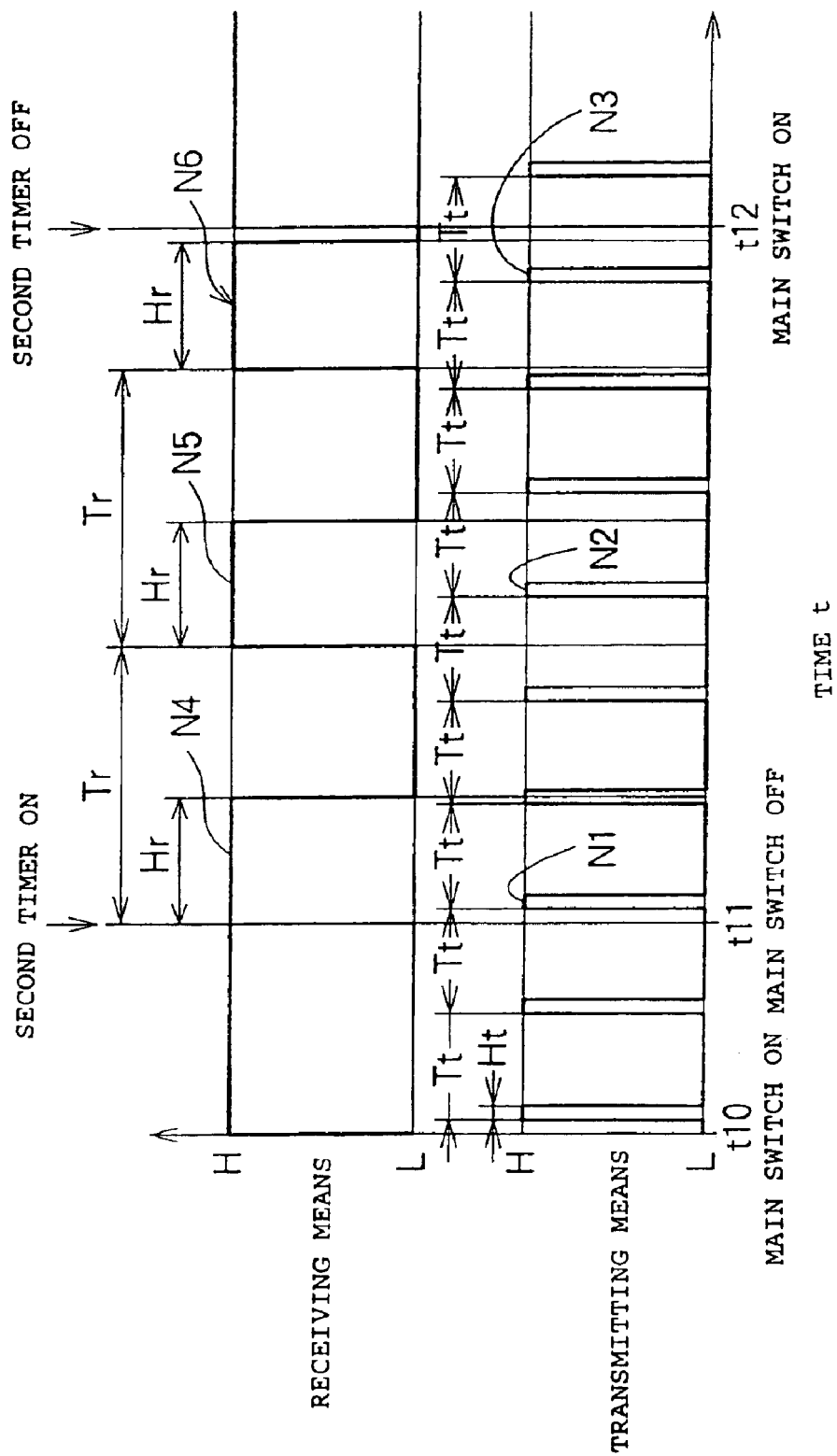
FIG. 8 is a graph illustrative of the operation of the tire air pressure detecting device according to a second embodiment of the present invention.

FIG. 8 is a graph illustrative of operation of the tire air pressure detecting device according to the second embodiment of the present invention, and illustrates how the receiving means 106 described with reference to FIG. 7 operates. The vertical axis of the graph represents the operating states of the transmitting means 105 and the receiving means 106 as an H level (when these means operate) and an L level (when these means do not operate), and the horizontal axis of the graph represents time t.

When the time t is t10, the transmitting means has already transmitted the air pressure signal and the temperature signal at a given frequency to the receiving means with the battery of the air pressure detector at the wheel. Operating time intervals of the transmitting means, i.e., transmitting time intervals, are referred to as "Tt", and the operating times of the transmitting means, i.e., the transmitting times, are referred to as "Ht."

At this time (t=t10), when the main switch is turned on, the receiving means is activated.

When the main switch is turned off (OFF) at the time t=t11, the second timer is activated (ON).

The receiving means is not shut off, but operates for a certain period of time at given time intervals. If the given time intervals, i.e., the receiving time intervals, are represented by Tr and the certain period of time, i.e., the receiving time, is represented by Hr, then the receiving time Hr and the transmitting time intervals Tt are related to each other by Hr>Tt.

The receiving means receives the air pressure signal and the temperature signal transmitted in operating periods N1, N2, N3 by the transmitting means, respectively in operating periods N4, N5, N6.

Upon operation of the receiving means, the second control means reads and stores the air pressure signal and the temperature signal while the receiving means is in operation.

When the main switch is turned on (ON) at the time t=t12, the second timer is inactivated (OFF), and the receiving means stops operating intermittently, but starts operating continuously.

At this time, the second control means processes the tire air pressure Pt and the tire temperature Ty (e.g., displays them, issues a warning, changes the engine output) which are obtained from the latest air pressure signal and temperature signal (signals in the operating period N6, or specifically signals transmitted from the transmitting means in the operating period N3).

Figure 9:
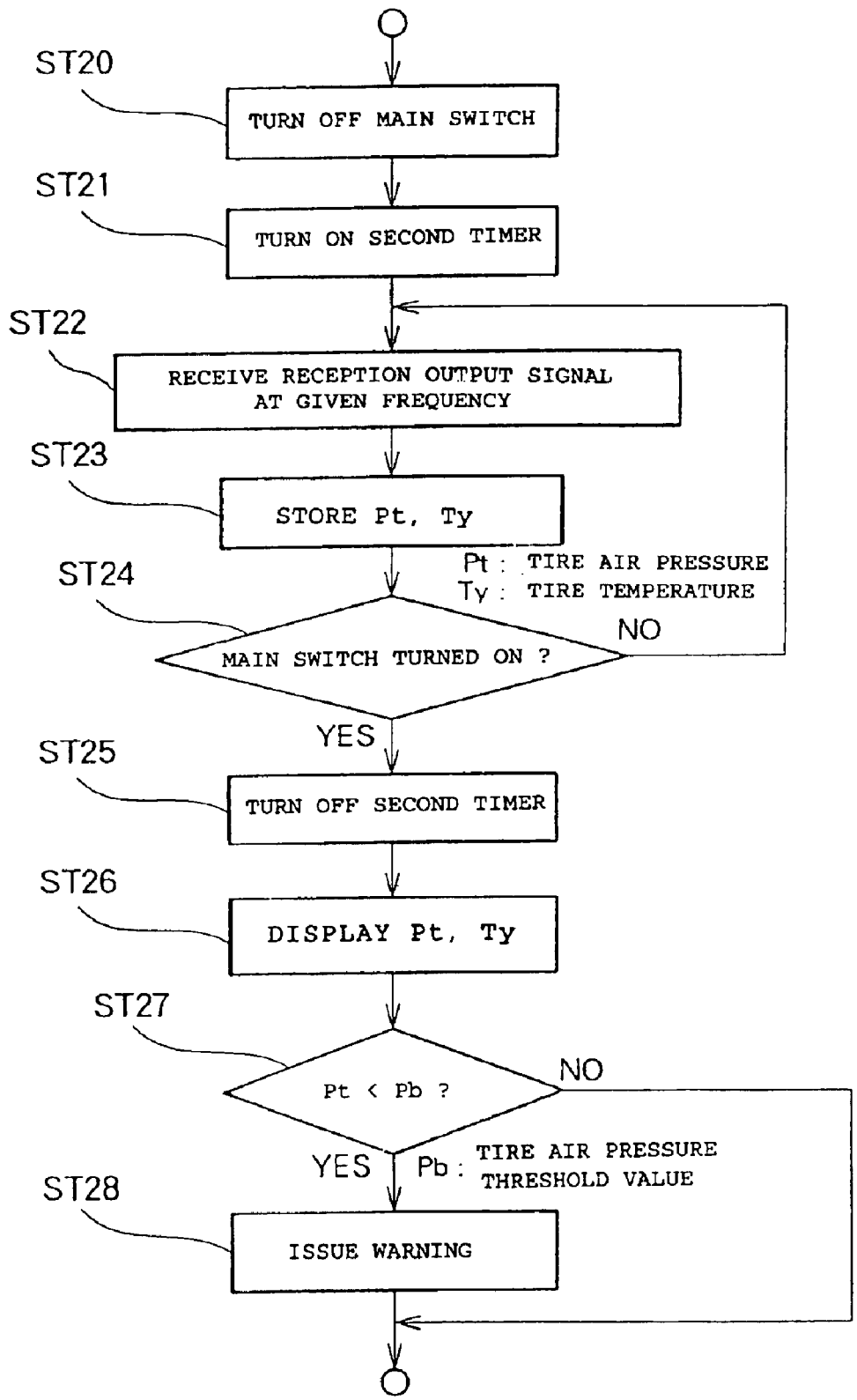
FIG. 9 is a flowchart illustrative of operation of the tire air pressure detecting device according to the second embodiment of the present invention.

FIG. 9 is a flowchart illustrative of operation of the tire air pressure detecting device according to the second embodiment of the present invention. In FIG. 9, STxx represents a step number (FIGS. 1 and 7 should be referred to for the reference numerals).

ST20 . . . The main switch 23 is turned off.

ST21 . . . The second timer 108 is turned on.

ST22 . . . The receiving means 106 receives a reception output signal (an air pressure signal and a temperature signal) at a given frequency (for the receiving time Hr at each of receiving time intervals Tr).

ST23 . . . The second control means 111 stores the tire air pressure Pt and the tire temperature Ty which are obtained from the reception output signal SB.

ST24 . . . It is determined whether the main switch 23 is turned on or not.

If the main switch 23 is not on (NO), i.e., if the main switch 23 is turned off, then control returns to ST22.

If the main switch 23 is on (YES), then control goes to ST25.

ST25 . . . The second timer 108 is turned off.

ST26 . . . The display unit 46 displays the tire air pressure Pt and the tire temperature Ty.

ST27 . . . The second control means 111 determines whether the tire air pressure Pt is lower than a tire air pressure threshold value Pb or not, i.e., whether Pt<Pb or not.

If not Pt<Pb (NO), then the processing is put to an end.

If Pt<Pb (YES), then control goes to ST28.

ST28 . . . The warning unit 47 issues a warning.

As described above with reference to FIGS. 1 and 7, the present invention resides in the tire air pressure detecting device 100 for monitoring a tire air pressure Pt by transmitting a signal representing the tire air pressure Pt detected at a wheel to a vehicle body and receiving the signal representing the tire air pressure Pt at the vehicle body, characterized by including the tire air pressure detecting means 71 on the wheel for detecting the tire air pressure Pt of the tires 26, 32, the transmitting means 105 on the wheel for transmitting an air pressure signal SP representing the tire air pressure Pt detected by the tire air pressure detecting means 71 to the vehicle body, the receiving means 106 on the vehicle body for receiving the air pressure signal SP transmitted as the transmission signal SS from the transmitting means 105, the main switch turn-off detecting means 107 for generating a main switch OFF signal Soff when the turn-off of the main switch 23 is detected, the second control means 111 on the vehicle body for receiving the main switch OFF signal Soff generated by the main switch turn-off detecting means 107 and the air pressure signal SP received by the receiving means 106, and storing the air pressure signal SP, and the second timer 108 on the vehicle body for operating the receiving means 106 for a constant period Hr of time at each of predetermined time intervals Tr when the second control means 111 receives the main switch OFF signal Soff.

When the main switch 23 is turned off, the receiving means 106 is operated for a certain period of time Hr at each of the given time intervals Tr for thereby enabling the second control means 111 to receive the air pressure signal SP and store the tire air pressure Pt obtained from the air pressure signal SP until the main switch 23 is turned on. When the main switch 23 is turned on at a next time, the driver is capable of recognizing the latest tire air pressure state from the stored tire air pressure Pt before the motor vehicle is operated.

In the present invention, the turn-on of the main switch is detected by the main switch ON detecting means. However, the turn-on of the main switch may be detected by the second control means itself when the second control means is energized at the time the main switch is turned on.

If a situation arises where the air pressure detector 41 at the wheel shown in FIG. 4 is unable to transmit a signal (due to a function failure of the various components of the air pressure detector 41, a battery power shortage, or the like), then the second control means 84 may detect that the reception output signal SB is not transmitted from the main receiving means 81 and sends a warning signal SK to the warning unit 47, which issues a warning by way of a light-emitting element or a sound generating member, indicating that the air pressure detector 41 suffers a fault. The driver can immediately know that the air pressure detector 41 suffers a fault, and quickly handle the fault of the air pressure detector 41 to prevent the tire air pressure and the tire temperature from failing to be detected.

The above processing may be applied to the embodiment shown in FIG. 7.

The present invention of the above arrangement offers the following effects:

The tire air pressure detecting device can provide tire air pressure detecting means on the wheel for detecting the tire air pressure. Main transmitting means are provided on the wheel for transmitting an air pressure signal representing the tire air pressure detected by the tire air pressure detecting means to the vehicle body. Main receiving means are provided on the vehicle body for receiving the air pressure signal transmitted from the main transmitting means. Main switch turn-on detecting means are provided on the vehicle body for generating a main switch ON signal when the turn-on of a main switch is detected. Vehicle body side control means are provided on the vehicle body for receiving the air pressure signal received by the main receiving means and the main switch ON signal generated by the main switch turn-on detecting means. Auxiliary transmitting means are provided on the vehicle body for transmitting a transmission instruction signal to the wheel to transmit a new air pressure signal from the main transmitting means to the main receiving means based on a vehicle body side control signal from the vehicle body side control means when the vehicle body side control means receives the main switch ON signal. Auxiliary receiving means are provided on the wheel for receiving the transmission instruction signal transmitted from the auxiliary transmitting means. Wheel side control means are provided on the wheel for generating a wheel side control signal to read a new air pressure signal from the tire air pressure detecting means and transmit the air pressure signal to the main transmitting means based on the transmission instruction signal received by the auxiliary receiving means. When the main switch is turned on, a transmission instruction signal is sent from the auxiliary transmitting means to the auxiliary receiving means to enable the vehicle body side control means to read a new air pressure signal. Therefore, the state of the tire air pressure can be recognized immediately when the main switch is turned on.

Accordingly, the main transmitting means is not required to transmit the air pressure signal at all times or increase the frequency with which to transmit the air pressure signal, and the consumption of the battery at the wheel can be reduced.

The tire air pressure detecting device can provide tire air pressure detecting means on the wheel for detecting the tire air pressure. Transmitting means are provided on the wheel for transmitting an air pressure signal representing the tire air pressure detected by the tire air pressure detecting means to the vehicle body. Receiving means are provided on the vehicle body for receiving the air pressure signal transmitted from the transmitting means. Main switch turn-off detecting means are provided on the vehicle body for generating a main switch OFF signal when the turn-off of a main switch is detected. Vehicle body side control means are provided on the vehicle body for receiving the main switch OFF signal generated by the main switch turn-off detecting means and the air pressure signal received by the receiving means, and storing the air pressure signal. A vehicle body side timer on the vehicle body is provided for operating the receiving means for a constant period of time at each of predetermined time intervals when the vehicle body side control means receives the main switch OFF signal. When the main switch is turned off, the receiving means is operated for a constant period of time at each of predetermined time intervals to enable the vehicle side control means to receive and store the air pressure signal until the main switch is turned on. When the main switch is turned on, the latest tire air pressure state before the motor vehicle starts to move can be recognized from the stored air pressure signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire air pressure detecting device for monitoring a tire air pressure by transmitting a signal representing the tire air pressure detected at a wheel to a vehicle body and receiving the signal representing the tire air pressure at the vehicle body comprising:

tire air pressure detecting means on the wheel for detecting the tire air pressures main transmitting means on the wheel for transmitting an air pressure signal representing the tire air pressure detected by said tire air pressure detecting means to the vehicle body;

main receiving means on the vehicle body for receiving the air pressure signal transmitted from said main transmitting means;

main switch turn-on detecting means on the vehicle body for generating a main switch ON signal when the turn-on of a main switch is detected;

vehicle body side control means on the vehicle body for receiving the air pressure signal received by said main receiving means and the main switch ON signal generated by said main switch turn-on detecting means;

auxiliary transmitting means on the vehicle body for transmitting a transmission instruction signal to the wheel to transmit a new air pressure signal from said main transmitting means to said main receiving means based on a vehicle body side control signal from said vehicle body side control means when said vehicle body side control means receives the main switch ON signal;

auxiliary receiving means on the wheel for receiving the transmission instruction signal transmitted from said auxiliary transmitting means;

wheel side control means on the wheel for generating a wheel side control signal to read a new air pressure signal from said tire air pressure detecting means and transmit the air pressure signal to said main transmitting means based on the transmission instruction signal received by said auxiliary receiving means, and in addition to transmitting the transmission instruction signal received by said auxiliary receiving means, the main transmitting means also transmitting the air pressure signal repetitively at a predetermined constant frequency, the predetermined constant frequency of transmitting the air pressure signal varying depending on a vehicle speed.

2. The tire air pressure detecting device for monitoring a tire air pressure according to claim 1, and further including a warning unit for providing a warning if the tire air pressure is not within predetermined guidelines.

3. The tire air pressure detecting device for monitoring a tire air pressure according to claim 2, and further including storage means for storing a range of tire air pressures and a range of vehicle speeds for providing said predetermined guidelines to said warning unit.

4. The tire air pressure detecting device for monitoring a tire air pressure according to claim 1, wherein the air pressure detecting means includes a detector body and a tire valve mounted on the detector body.

5. The tire air pressure detecting device for monitoring a tire air pressure according to claim 4, and further including a seal member disposed between the detector body and the wheel for preventing air from leaking out of an air chamber in the tire.

6. The tire air pressure detecting device for monitoring a tire air pressure according to claim 4, and further including a nut threaded on said tire valve for securing said detector body to the wheel.

7. The tire air pressure detecting device for monitoring a tire air pressure according to claim 4, wherein the detector body is formed with a communication hole, the detector body being disposed in a recess in the wheel.

8. The tire air pressure detecting device for monitoring a tire air pressure according to claim 4, and further including a nut threaded on said tire valve for securing said detector body to a recess of the wheel.

9. The tire air pressure detecting device for monitoring a tire air pressure according to claim 4, and further including a nut threaded on said tire valve for securing said detector body to the wheel, the nut being a single nut for securing both of said detector body and said tire valve to the wheel.

10. The tire air pressure detecting device for monitoring a tire air pressure according to claim 9, wherein the nut threaded on said tire valve presses against a surface area of the wheel which is opposite to a surface of the wheel where said detector body is secured to the wheel.

11. The tire air pressure detecting device for monitoring a tire air pressure according to claim 1, wherein the predetermined constant frequency of transmitting the air pressure varies on a stepwise basis depending on a vehicle speed.

* * * * *